(12) United States Patent
Sakashita et al.

(10) Patent No.: US 7,432,320 B2
(45) Date of Patent: Oct. 7, 2008

(54) PROCESSING AID FOR VINYL CHLORIDE RESIN AND VINYL CHLORIDE RESIN COMPOSITION

(75) Inventors: Noriko Sakashita, Akashi (JP); Yasuhiro Miki, Himeji (JP); Akira Takaki, Kobe (JP)

(73) Assignee: Kaneka Corporation, Osaka (JP)

( * ) Notice: Subject to any disclaimer, the term of this patent is extended or adjusted under 35 U.S.C. 154(b) by 197 days.

(21) Appl. No.: 10/730,887

(22) Filed: Dec. 10, 2003

(65) Prior Publication Data

US 2004/0116580 A1     Jun. 17, 2004

(51) Int. Cl.
C08F 265/06    (2006.01)
C08F 2/16      (2006.01)
C08L 27/06     (2006.01)
C08L 51/00     (2006.01)

(52) U.S. Cl. .................. 524/458; 524/523; 524/527; 525/80; 525/85; 525/227; 525/239

(58) Field of Classification Search ................ 524/458, 524/523, 527; 525/85, 80, 227, 239
See application file for complete search history.

(56) References Cited

U.S. PATENT DOCUMENTS

| | | | | |
|---|---|---|---|---|
| 4,179,481 A | * | 12/1979 | Tuzuki et al. ............. | 525/80 |
| 4,268,636 A | | 5/1981 | Iizuka et al. ............. | 525/85 |
| 5,093,420 A | * | 3/1992 | Matsuba et al. ........... | 525/85 |

FOREIGN PATENT DOCUMENTS

| | | | | |
|---|---|---|---|---|
| EP | 0 392 465 | | 10/1990 | |
| EP | 392 465 | * | 10/1990 | .......... 525/85 |
| FR | 2 180 595 | | 11/1973 | |
| GB | 1 378 434 | | 12/1974 | |
| GB | 1378434 | * | 12/1974 | .......... 524/80 |
| JP | 47-23443 | | 10/1972 | |
| JP | 49-90338 | | 8/1974 | |
| JP | 49-120945 | | 11/1974 | |
| JP | 50-123761 | | 9/1975 | |
| JP | 50-123764 | | 9/1975 | |
| JP | 56-163139 | | 12/1981 | |
| JP | 60-258241 | | 12/1985 | |
| JP | 01-215846 | | 8/1989 | |
| JP | 01215846 | * | 8/1989 | .......... 525/229 |
| JP | 10-17626 | | 1/1998 | |
| JP | 10-82911 | | 7/1998 | |
| JP | 10-182911 A | | 7/1998 | |

\* cited by examiner

*Primary Examiner*—Kelechi C Egwim
(74) *Attorney, Agent, or Firm*—Westerman, Hattori, Daniels & Adrian, LLP.

(57) ABSTRACT

There is provided a vinyl chloride resin composition, which is excellent in processability and can produce a processed article having excellent physical property or a formed molding having excellent property. A processing aid having specific viscosity of at least 0.5 is combined with a vinyl chloride resin, wherein the aid is obtained by polymerizing 1 to 50 parts by weight of a monomer mixture (B) comprising 0 to 49% by weight of methyl methacrylate, 51 to 100% by weight of at least one monomer selected from the group consisting of a methacrylate ester except methyl methacrylate and an acrylate ester, and 0 to 20% by weight of a vinyl monomer copolymerizable therewith, in the presence of a latex of a (co) polymer having specific viscosity of at least $\eta_{sp}$ 0.7, which is obtained by polymerizing in emulsion 99 to 50 parts by weight of a monomer mixture (A) comprising 51 to 100% by weight of methyl methacrylate, 0 to 49% by weight of at least one monomer selected from the group consisting of a methacrylate ester except methyl methacrylate and an acrylate ester, and 0 to 20% by weight of a vinyl monomer copolymerizable therewith, wherein the total amount of (A) and (B) is 100 parts by weight.

4 Claims, No Drawings

PROCESSING AID FOR VINYL CHLORIDE RESIN AND VINYL CHLORIDE RESIN COMPOSITION

TECHNICAL FIELD

The present invention relates to a processing aid for a vinyl chloride resin and a vinyl chloride resin composition containing the processing aid (and a foaming agent) having excellent processability, which can provide a processed article having excellent physical property or a formed article having satisfactory property. More particularly it relates to a processing aid for a vinyl chloride resin comprising methyl methacrylate, a methacrylate ester except for methyl methacrylate and/or an acrylate ester as a main component, and a vinyl chloride resin composition which contains the processing aid, a vinyl chloride resin, and a foaming agent as an optional component.

BACKGROUND ART

A vinyl chloride resin has been widely employed in various fields, since it can produce a processed article having excellent physical and chemical property. But there are various problems in processing such as a narrow processing temperature and slow melting, since a processing temperature is close to the decomposition temperature thereof.

Many technologies, which overcome the above-mentioned processing problems, have recently been known. As a typical technology, examples thereof are a method of adding a plasticizer to a vinyl chloride resin, a method of employing a vinyl chloride resin copolymerized with another monomer such as vinyl acetate, and a method of mixing a vinyl chloride resin with another resin component.

However, all these methods can not satisfactorily improve processability with keeping excellent physical and chemical property which the vinyl chloride resin originally has. For example, in case of adding a plasticizer to a vinyl chloride resin, or employing a vinyl chloride resin copolymerized with another monomer, physical property of the processed article changes drastically. Most of the methods of mixing a vinyl chloride resin with another resin component is a method of lowering processing temperature by lowering melt viscosity at mold processing. It seemingly improves fluidity of a vinyl chloride resin, but indeed gelation of a vinyl chloride resin becomes unsatisfactory due to consumption of mixing energy through fluidity. Therefore, in the application in which transparency is required, there arises a problem that physical property thereof is inferior to that of the completely gelled vinyl chloride resin even if the processed article prepared therefrom seemingly becomes transparent.

In order to solve the above-mentioned problems, Japanese Examined Patent Publication No. 5311/1965 discloses a method of adding, as a processing aid, a copolymer of methyl methacrylate as a main component having comparatively high molecular weight. But the added processing aid is apt to be left as non-gelled object (usually called "fish eye") in the processed article, it is easy to lose appearance of molding. And the other effects of adding a processing aid, such as gloss improvement of product, improvement of secondary processability, and decrease of specific gravity by foam molding, are not satisfactorily revealed.

And Japanese Examined Patent Publication No. 49020/1977 and No. 2898/1978 disclose a composition which contains a processing aid prepared by two step polymerization. At first a major amount of methacrylate ester is polymerized followed by polymerization of a minor amount of acrylate ester in the presence of a latex of poly(methyl methacrylate) or a copolymer of a major amount of methyl methacrylate and a minor amount of acrylate ester. The method was effective in prevention of the above-mentioned non-gelled object, but the effect thereof was not satisfactory. And depending on mixing and application, there arised many problems caused by unsatisfactory dispersion of a processing aid in a vinyl chloride resin composition, such as decrease of molding transparency of a vinyl chloride resin, decrease of gelation ratio, and decrease of secondary processability such as elongation at a high temperature.

Foam molding has recently attracted considerable attention as a method of decreasing a density of a processed article and lowering cost of molding. In the above-mentioned foam molding of a vinyl chloride resin, there has been known a method of employing a processing aid containing methyl (meth)acrylate as a main component and a foaming agent. But it was difficult to raise expansion ratio to not less than 3 times with keeping uniformity of molding appearance, and uniformity and minuteness of foaming cell. On the other hand, formed molding of a vinyl chloride resin having higher expansion ratio has been strongly demanded in the market.

As disclosed in Japanese Examined Patent Publication No. 5311/1965, it has been known that processability can be improved by adding a copolymer comprising methyl methacrylate as a main component having high molecular weight to a vinyl chloride resin. It can be expected that the higher the molecular weight thereof becomes, the higher the effect thereof becomes. But in case of employing the processing aid having merely raised molecular weight, not only transparency, but also a gel ratio thereof may be lowered and secondary processability such as elongation at a high temperature as well. Therefore, it is not always practical.

Influence of a micro structure of the processing aid in the final composition has never been understood in detail. But it should be the reason that dispersibility becomes low with increasing the molecular weight thereof.

DISCLOSURE OF THE INVENTION

With respect to the above-mentioned circumstances, a processing aid is investigated from the composition thereof, so that gelation property, processability and foamability of the composition can be improved by adding a smaller amount of the processing aid. And it has been found that the above-mentioned objects are achieved by employing, as a processing aid, the polymer of which outer layer is formed by polymerizing a particular amount of monomer in the presence of a latex of a satisfactory polymerized (co)polymer having a particular composition comprising methyl methacrylate as a main component.

Namely, the present invention relates to a processing aid for a vinyl chloride resin having specific viscosity $\eta_{sp}$ of at least 0.5, which is obtained by polymerizing 1 to 50 parts by weight of a monomer mixture (B) comprising 0 to 49% by weight of methyl methacrylate, 51 to 100% by weight of at least one monomer selected from the group consisting of a methacrylate ester except methyl methacrylate and an acrylate ester, and 0 to 20% by weight of a vinyl monomer copolymerizable therewith, in the presence of a latex of a (co)polymer having specific viscosity $\eta_{sp}$ of at least 0.7, which is obtained by polymerizing in emulsion 99 to 50 parts by weight of a monomer mixture (A) comprising 51 to 100% by weight of methyl methacrylate, 0 to 49% by weight of at least one monomer selected from the group consisting of a methacrylate ester except methyl methacrylate and an acrylate ester, and 0 to 20% by weight of a vinyl monomer copolymerizable therewith, wherein the total amount of (A) and (B) is 100 parts (claim 1), the processing aid of claim 1, wherein the processing aid for a vinyl chloride resin is a processing aid for a vinyl chloride resin containing a foaming agent (claim 2), a vinyl chloride resin composition comprising 100 parts by weight of a vinyl chloride resin and 0.1 to 30 parts by weight of the processing aid of claim 1 (claim 3), and a vinyl chloride resin composition containing a foaming agent comprising 100 parts by weight of a vinyl chloride resin, 0.1 to 30 parts by weight of the processing aid of claim 1 and a foaming agent (claim 4).

BEST MODE FOR CARRYING OUT THE INVENTION

The characteristic of the present invention is to employ a (co)polymer mixture as a processing aid for a vinyl chloride resin, wherein the (co)polymer mixture (hereinafter referred to as "polymer mixture prepared by two step polymerization") is obtained by adding and polymerizing a monomer mixture (B) containing a major amount of at least one monomer selected from the group consisting of a methacrylate ester except methyl methacrylate and an acrylate ester, in the presence of a (co)polymer (hereinafter referred to as "polymer mixture at the first step") obtained by polymerizing in emulsion a monomer mixture (A) containing a major amount of methyl methacrylate as a first step component. The polymer mixture at first step and at second step respectively have not less than 0.7 and 0.5 of specific viscosity at 30° C., measured by using 100 ml chloroform solution containing 0.1 g of the polymer mixture.

By using the polymer mixture prepared by the two step polymerization as a processing aid for a vinyl chloride resin, there can be remarkably expressed the following effects, which are expected by adding a processing aid.
(1) Gelation can be promoted and secondary processability can be improved by adding a small amount thereof without losing physical and chemical property, which a vinyl chloride resin originally has.
(2) Specific gravity at foaming can be lowered.
(3) Gloss of a product can be improved.

The processing aid of the present invention comprises a polymer mixture prepared by the two step polymerization, which is obtained by polymerizing a monomer mixture (B) in the presence of a latex of a polymer at the first step obtained by polymerizing in emulsion a monomer mixture (A).

The monomer mixture (A) comprises 51 to 100% by weight, preferably 60 to 90% by weight, more preferably 70 to 85% by weight of methyl methacrylate, 0 to 49% by weight, preferably 0 to 40% by weight, more preferably 0 to 30% by weight of at least one monomer selected from the group consisting of a methacrylate ester except methyl methacrylate and an acrylate ester, and 0 to 20% by weight, preferably 0 to 10% by weight, more preferably 0 to 5% by weight of a vinyl monomer copolymerizable therewith.

If a ratio of methyl methacrylate in the monomer mixture (A) is under 51% by weight, transparency and processability are decreased. On the other hand, if the monomer selected from the group consisting of a methacrylate ester except methyl methacrylate and an acrylate ester is beyond 49% by weight, transparency and processability are decreased. And if the vinyl monomer copolymerizable therewith is beyond 20% by weight, gelation property and transparency are decreased.

As the methacrylate ester except methyl methacrylate in the monomer mixture (A), examples are an alkyl methacrylate ester having 2 to 8 carbon atoms of an alkyl group such as ethyl methacrylate, propyl methacrylate, butyl methacrylate or 2-ethylhexyl methacrylate, and the like. And examples of an acrylate ester are an alkyl acrylate ester having 1 to 8 carbon atoms of an alkyl group such as methyl acrylate, ethyl acrylate, propyl acrylate, butyl acrylate or 2-ethylhexyl acrylate, and the like. These methacrylate ester except methyl methacrylate and acrylate ester may be used solely or in a combination use of two or more thereof.

As the vinyl monomer copolymerizable therewith in the monomer mixture (A), examples are an aromatic vinyl compound such as styrene and α-methylstyrene, and an unsaturated nitrile compound such as acrylonitrile. These may be used solely or in a combination use of two or more thereof.

Specific viscosity $\eta_{sp}$ of the (co)polymer (polymer at the first step) obtained by polymerizing in emulsion a monomer mixture (A) is at least 0.7, preferably 0.7 to 1.9, more preferably 0.8 to 1.8, particularly 0.9 to 1.7. The specific viscosity is measured at 30° C. by using 100 ml chloroform solution containing 0.1 g of the polymer mixture. If the specific viscosity is less than 0.7, processability can not be satisfactorily improved. And if the viscosity is above 1.9, transparency and processability tend to be decreased.

The monomer mixture (B) comprises 0 to 49% by weight, preferably 20 to 49% by weight, more preferably 30 to 45% by weight of methyl methacrylate, 51 to 100% by weight, preferably 51 to 80% by weight, more preferably 55 to 70% by weight of at least one monomer selected from the group consisting of a methacrylate ester except methyl methacrylate and an acrylate ester, and 0 to 20% by weight, preferably 0 to 10% by weight, more preferably 0 to 5% by weight of the vinyl monomer copolymerizable therewith.

By polymerizing a monomer mixture (B) in the presence of a latex of polymer at the first step to prepare a (co)polymer comprising the mixture (B) outside the polymer at the first step, gelation can be promoted and non-gelled product can be prevented from occurring in case of adding the processing aid to a vinyl chloride resin. As a result, viscosity and elasticity can be supplied effectively to a vinyl chloride resin.

If a ratio of methyl methacrylate in the monomer mixture (B) is above 49% by weight, excellent gelation property is apt to be lost or the non-gelled product easily occurs. If the monomer selected from the group consisting of a methacrylate ester except methyl methacrylate and an acrylate ester is under 51% by weight, the same phenomena occur. And, if necessary, the vinyl monomer copolymerizable therewith can be employed in an amount of under 20% by weight. But the amount thereof is preferably as small as possible.

As the methacrylate ester except methyl methacrylate in the monomer mixture (B), examples are an alkyl methacrylate ester having 2 to 8 carbon atoms of an alkyl group such as ethyl methacrylate, propyl methacrylate, butyl methacrylate or 2-ethylhexyl methacrylate, and the like. And examples of the acrylate ester are an alkyl acrylate ester having 1 to 8 carbon atoms of an alkyl group such as methyl acrylate, ethyl acrylate, propyl acrylate, butyl acrylate or 2-ethylhexyl acrylate, and the like. These methacrylate ester except methyl methacrylate and acrylate ester may be used solely or in a combination use of two or more thereof. Among those, butyl acrylate is preferable from the viewpoint of obtaining a polymer having a low glass transition temperature.

As the vinyl monomer copolymerizable therewith in the monomer mixture (B), examples are an aromatic vinyl compound such as styrene or α-methylstyrene, and an unsaturated nitrile compound such as acrylonitrile. These may be used solely or in a combination use of two or more thereof.

A ratio of the monomer mixture (A) to the monomer mixture (B) is 50 to 99 parts by weight, preferably 60 to 95 parts by weight, more preferably 65 to 90 parts by weight of the monomer mixture (A), and 1 to 50 parts by weight, preferably 5 to 40 parts by weight, more preferably 10 to 35 parts by weight of the monomer mixture (B), wherein the total part is 100 parts.

If the amount of the monomer mixture (A) (polymer at the first step) is above 99 parts by weight, dispersibility of the processing aid to a vinyl chloride resin is decreased, and the non-gelled product occurs. On the other hand, if the amount is under 50 parts by weight, gelation property of the vinyl chloride resin can not be satisfactorily improved. And if the amount of the (co)polymer (polymer prepared by two-step polymerization) prepared from the monomer mixture (B) is above 50 parts by weight, gelation property and transparency of the vinyl chloride resin composition are decreased. On the other hand, if the amount is under 1 part by weight, dispersibility of the processing aid to a vinyl chloride resin is decreased, and the non-gelled product occurs. Since the (co) polymer prepared from a monomer mixture (B) is the outside of polymer at the first step, gelation property and processability can be remarkably improved. As a result, effect of adding the processing aid of the present invention can be remarkably improved.

For example, the processing aid of the present invention can be prepared by the following method.

At first, a monomer mixture (A) is polymerized in emulsion in the presence of a suitable solvent, an emulsifier, a polymerization initiator and a chain transfer agent to obtain a latex of polymer at the first step prepared from the monomer mixture (A). Secondly, a monomer mixture (B) is added into the latex of the polymer at the first step to start polymerization. Polymer mixture prepared by two step polymerization, wherein the polymer at the first step is an inner layer and the (co)polymer prepared from a monomer mixture (B) is an outer layer, is prepared by polymerizing each mixture one by one.

Polymerization medium employed in the emulsion polymerization is generally water.

As the emulsifier, the conventional emulsifier can be employed. Examples thereof are an anionic surfactant such as a fatty acid salt, an alkylsulfate salt, an alkylbenzenesulfate salt, an alkylphosphate salt or a sulfosuccinate diester salt, a non-ionic surfactant such as polyoxyethylene alkyl ether or polyoxyethylene fatty acid ester.

As the polymerization initiator, examples are a water soluble polymerization, an oil soluble polymerization initiator and the like. For examples, an inorganic polymerization initiator such as a conventional persulfonate salt, an organic peroxide, or an azo compound may be employed solely. These initiator compounds can be employed as a redox type by combining it with a sulfite salt, a thiosulfate salt, a metallic primary salt, or sodium formaldehydesulfoxylate. As a preferable persulfonate salt, examples are sodium persulfonate, potassium persulfonate, ammonium persulfonate and the like. As a preferable organic peroxide compound, examples are t-butyl hydroperoxide, cumene hydroperoxide, benzoyl peroxide, lauroyl peroxide and the like.

There is no particular limitation for the above-mentioned chain transfer agent. Examples thereof are t-dodecylmercaptane, t-decylmercaptane, n-dodecylmercaptane, n-decylmercaptane and the like.

There is no particular limitation for time and temperature of the above-mentioned polymerization reaction. And these may be suitably controlled in such a way that desired specific viscosity and particle diameter can be achieved.

In case of adding a monomer mixture (B), polymerization at each step can be carried out by confirming completion of the first step polymerization without mixing a monomer mixture (A) with the monomer mixture (B).

The obtained latex of polymer mixture prepared by the two step polymerization has an average particle diameter of 100-3000 Å, preferably 100-2000 Å. The polymer mixture is removed from the latex by salting out or coagulation of adding a conventional electrode, or spraying into a hot air or dryer. If necessary, the mixture is washed, dehydrated and dried by the conventional method.

Specific viscosity of the obtained polymer mixture prepared by the two step polymerization is at least 0.5, preferably 0.5 to 1.7, more preferably 0.6 to 1.6, particularly preferably 0.7 to 1.5. The specific viscosity is measured at 30° C. by using 100 ml chloroform solution containing 0.1 g of the polymer mixture. If the viscosity is under 0.5, processability can not satisfactorily improved. On the other hand, if the viscosity is above 1.7, transparency and processability tend to be decreased.

White powder having an average diameter of 20 to 300 μm is generally separated from the obtained polymer mixture prepared by the two step polymerization, and it is mixed as a processing aid with a vinyl chloride resin or a vinyl chloride resin containing a foaming agent.

The processing aid of the present invention is mixed with a vinyl chloride resin by the conventional method to prepare the vinyl chloride resin composition of the present invention.

A mixing ratio of the vinyl chloride resin to the processing aid is 0.1 to 30 parts by weight of the processing aid, preferably 0.5 to 20 parts by weight, more preferably 1 to 10 parts by weight based on 100 parts by weight of the vinyl chloride resin. If the amount thereof is under 0.1 part by weight, the effect thereof can not be satisfactorily obtained. On the other hand, if the amount is beyond 30 parts by weight, excellent mechanical property of the vinyl chloride resin becomes lowered.

As the vinyl chloride resin, example is a polymer comprising 80 to 100% by weight of a vinyl chloride monomer unit and 0 to 20% by weight of another monomer unit copolymerizable therewith.

As the other monomer copolymerizable therewith, examples are vinyl acetate, propylene, styrene, acrylate and the like. These may be employed solely or in a combination use of two or more thereof.

There is no particular limitation for an average molecular weight of the vinyl chloride resin, and the conventional vinyl chloride resin may be suitably employed. Example thereof are poly(vinyl chloride), a copolymer comprising at least 80% by weight of a vinyl chloride monomer and the other monomer copolymerizable therewith (for instance, vinyl acetate, propylene, styrene, acrylate ester), and post-chlorinated poly(vinyl chloride), and the like. These may be employed solely or in a combination use of two or more thereof.

In case of preparing the vinyl chloride resin composition, a foaming agent may be added to prepare the vinyl chloride resin composition containing a foaming agent. In this case, the processing aid can be employed as the processing aid for the vinyl chloride resin composition containing a foaming agent.

There is no particular limitation for an amount of the foaming agent in the vinyl chloride resin composition containing a foaming agent, and the amount is suitably determined depending on the object. If the amount is too low, a processed article having a sufficient expansion ratio can not be obtained. On the other hand, if the amount is too high, a uniform foamed molding can not be obtained. Therefore, the amount thereof is generally 0.2 to 6 parts by weight based on 100 parts by weight of the vinyl chloride resin. In this case, an expansion ratio of the foamed molding becomes about 2 to 5 times.

As the foaming agent employed in the present invention, preferable examples are an inorganic foaming agent of thermal decomposition type and an organic foaming agent of thermal decomposition type. Examples of the inorganic foaming agent of thermal decomposition type are, for instance, sodium bicarbonate, ammonium bicarbonate, ammonium carbonate and the like. Examples of the organic foaming agent of thermal decomposition type are, for instance, a nitroso compound such as N,N'-dinitrosopentamethylenetetramine or N,N'-dimethyl-N,N'-dinitrosoterephthalamide, an azo compound such as azo dicarboxylamide or azobisisobutyronitrile, a sulfonylhydrazide compound such as benzene sulfonylhydrazide or toluene sulfonylhydrazide, and the like.

Examples other than the above-mentioned agent are an inert gas such as carbon dioxide or nitrogen, and a foaming agent of an organic solvent type such as propane, butane, pentane, methyl chloride, chloroform, trichloroethylene or chloromethane. These may be employed solely or in a combination use of two or more thereof.

To the vinyl chloride resin composition (containing a foaming agent as an optional component) of the present invention there may be practically added a stabilizer, a lubricant, an impact modifier, a plasticizer, a colorant and a filler, if necessary.

The vinyl chloride resin composition (containing a foaming agent as an optional component) of the present invention is excellent in processability, and can be processed by blow molding, injection molding, calendering or extrusion. Since the obtained processed article is excellent in appearance such as transparency, gloss or surface smoothing, and secondary processability, and a molding having low specific gravity can be obtained in case of foamed molding, the resin composition can be applied to all fields employing a vinyl chloride resin such as film, sheet, and profile extrusion. Especially, from the viewpoint of low specific gravity and surface smoothing, the composition can be preferably employed for preparation of foamed articles.

The present invention are explained concretely by means of Examples and Comparative Examples, but the Examples do not limit the present invention. "Parts" in Examples means "parts by weight" unless otherwise specified.

Evaluation items and evaluation methods used in Examples and Comparative Examples are as mentioned below.

[Measurement of Specific Viscosity ($\eta$ sp)]

Into 100 ml of chloroform, 0.1 g of a sample was dissolved and viscosity was measured by employing Ubbelohde's viscometer maintained at a constant temperature in 30° C. water bath.

[Gelation Property]

To 100 parts by weight of poly(vinyl chloride) (average molecular weight 680) were added 6.0 parts of a processing aid, 5.0 parts of calcium carbonate, 3.0 parts of titan oxide, 3.0 parts of dibasic lead phosphite, 0.4 part of lead stearate, 0.8 part of calcium stearate, 0.3 part of hydroxystearic acid (LOXIOL G-21 available from Henkel company), an aliphatic carboxylate ester (LOXIOL G-32 available from Henkel company), 0.4 part of dibasic ester of an aliphatic alcohol (LOXIOL G-60 available from Henkel company) and 0.5 part of oxidized polyethylene wax (Hoechst-Wachs PED-521 available from Hoechst), and then they were mixed by means of a Henschel mixer. After the inner temperature was raised to 110° C., the mixture was cooled to obtain a powder compound.

Gelation property was evaluated by a slop of a straight line between a maximum torque and a minimum torque on kneading time vs. torque curve, which was obtained by kneading 62 g of the obtained powder compound at 150° C. by means of a small kneading machine (Plasticoder PLE-331 made by Brabender). It was judged that the gelation property was better in case of a bigger slope.

[Transparency]

To 100 parts of poly(vinyl chloride) (average molecular weight 680) were added 3.0 parts of a processing aid, 1.5 parts of an octyl tin mercaptide stabilizer, 1.5 parts of an epoxidized soybean oil, 1.0 part of butyl steatate and 0.5 part of a polyethylene glycol fatty acid ester, and then they were mixed by means of a Henschel mixer. After the inner temperature was raised to 110° C., the mixture was cooled to obtain a powder compound. The vinyl chloride resin composition was milled at 170° C. for five minutes by means of 8 inches test roll, then pressed at 180° C. for fifteen minutes to prepare a pressed plate having 3 mm thickness. All light transmittance and haze of the obtained pressed plate were measured according to JIS-6714. It is indicated that the transparency is more excellent in case of the bigger all light transmittance. And it is also indicated that the transparency is more excellent in case of the smaller haze.

[Foamability]

To the compound used in the evaluation of gelation property was added 1.0 part of azo dicarboxylamide to obtain a powder compound in the same manner as the above-mentioned method. And then the compound was extruded at 170° C. by a small conical screw extruder (2D20C) attached to a labo plastmill (made by Toyoseiki company) in order to produce a foamed profile. Specific gravity of the obtained profile was measured. It is indicated that the expansion ratio is bigger and the formability is more excellent in case of the smaller specific gravity.

EXAMPLE 1

To an 8 litter reactor equipped with a stirrer was added 0.7 part of sodium dioctylsulfosuccinate previously dissolved in water. And additional water was added in a total amount of 200 parts, wherein the amount includes an amount of water contained in an additional material added afterward. After the air was replaced by nitrogen gas in the reactor, the content was heated to 70° C. with stirring.

Next, to the reactor was added simultaneously a monomer mixture (A) comprising 60 parts of methyl methacrylate (MMA) and 20 parts of butyl acrylate (BA). After 0.005 part of potassium persulfate was added, stirring was continued for one hour to complete the polymerization substantially.

To the mixture was added continuously a monomer mixture (B) comprising 6 parts of MMA and 14 parts of BA at a rate of about 30 parts per one hour. After the completion of a monomer mixture (B) addition, the content was maintained at 70° C. for 90 minutes, and was cooled to obtain a polymer latex.

The polymerization conversion was 99.5%. The obtained latex was coagulated by a calcium chloride aqueous solution.

After the latex was heated to 90° C., it was filtered by a centrifuge. The obtained dehydrated cake of the polymer mixture was washed with the same amount of water as the mixture, and it was dried at 50° C. for 15 hours by a parallel flow drier to obtain a white powder sample (1).

The above-mentioned evaluations were carried out by using the obtained sample. Table 1 shows results with composition of the products. Abbreviations in Table 1 indicate the followings:

MMA: methyl methacrylate
BA: butyl acrylate
BMA: butyl methacrylate
EA: ethyl acrylate
AN: acrylonitrle

EXAMPLES 2 to 7 and COMPARATIVE EXAMPLES 1 to 3

According to the compositions shown in Table 1, samples 2 to 10 were obtained in the same manner as in Example 1. The above-mentioned evaluations were carried out for the obtained samples. Table 1 shows the results thereof.

TABLE 1

| Sample | No. | Composition (Parts) Monomer Mixture (A) or Corresponding Mixture | | | | | | Monomer Mixture (B) | | $\eta_{sp}$ Polymer at first step | $\eta_{sp}$ Polymer at second step | Average Particle Diameter of Latex (Å) | Transparency All Light Trans-mittance (%) | Claud Value (%) | Gelation Property (Nm/min.) | Formability (g/cm³) |
|---|---|---|---|---|---|---|---|---|---|---|---|---|---|---|---|---|
| | | MMA | BMA | BA | EA | AN | St | MMA | BA | | | | | | | |
| Ex. No. | | | | | | | | | | | | | | | | |
| 1 | (1) | 60 | — | 20 | — | — | — | 6 | 14 | 1.11 | 0.80 | 1600 | 72.5 | 15.5 | 8.21 | 0.43 |
| 2 | (2) | 65 | — | 10 | — | 5 | — | 6 | 14 | 1.13 | 0.84 | 1600 | 69.6 | 15.5 | 8.14 | 0.45 |
| 3 | (3) | 65 | 10 | — | — | — | 5 | 6 | 14 | 1.12 | 0.80 | 1500 | 69.6 | 15.5 | 8.02 | 0.46 |
| 4 | (4) | 68 | — | — | 12 | — | — | 6 | 14 | 1.12 | 0.80 | 1600 | 68.7 | 15.7 | 8.12 | 0.44 |
| 5 | (5) | 65 | — | — | 5 | 10 | — | 6 | 14 | 1.11 | 0.81 | 1700 | 68.9 | 15.6 | 8.08 | 0.46 |
| 6 | (6) | 70 | — | 4 | — | — | 6 | 6 | 14 | 1.11 | 0.82 | 1500 | 68.2 | 16.2 | 5.21 | 0.50 |
| 7 | (7) | 75 | — | — | — | 5 | — | 6 | 14 | 1.06 | 0.79 | 1600 | 67.5 | 29.6 | 4.80 | 0.55 |
| Com. Ex. No. | | | | | | | | | | | | | | | | |
| 1 | (8) | 24 | — | 56 | — | — | — | 6 | 14 | 1.11 | 0.80 | 1600 | 50.0 | 25.2 | 2.56 | 0.88 |
| 2 | (9) | 32 | — | 48 | — | — | — | 6 | 14 | 1.12 | 0.82 | 1600 | 58.3 | 21.4 | 2.88 | 0.85 |
| 3 | (10) | 48 | — | — | 12 | — | 20 | 6 | 14 | 1.03 | 0.80 | 1700 | 59.7 | 22.4 | 2.67 | 0.80 |

As is clear from the results of Table 1, it is seen that the composition having excellent gelation property and foamability can be obtained by using samples 1 to 7, but that gelation property and foamability decrease by using samples 8 to 10 prepared from a monomer mixture (A) in an amount that a ratio of a methacrylate other than methyl methacrylate, an acrylate and a vinyl monomer copolymerizable therewith is above the range of the present invention.

EXAMPLES 8 to 12 and COMPARATIVE EXAMPLES 4 to 6

According to the compositions shown in Table 2, samples 11 to 18 were obtained in the same manner as in Example 1. The above-mentioned evaluations were carried out for the obtained samples. Table 2 shows the results thereof.

TABLE 2

| Sample | No. | Composition (Parts) Monomer Mixture (A) | | Monomer Mixture (B) or Corresponding Mixture | | | | | | $\eta_{sp}$ Polymer at first step | $\eta_{sp}$ Polymer at second step | Average Particle Diameter of Latex (Å) | Transparency All Light Trans-mittance (%) | Claud Value (%) | Gelation Property (Nm/min.) | Formability (g/cm³) |
|---|---|---|---|---|---|---|---|---|---|---|---|---|---|---|---|---|
| | | MMA | BA | MMA | BMA | BA | EA | AN | St | | | | | | | |
| Ex. No. | | | | | | | | | | | | | | | | |
| 8 | (11) | 68 | 12 | 8 | 2 | 10 | — | — | — | 1.12 | 0.84 | 1600 | 72.0 | 15.1 | 8.14 | 0.43 |
| 9 | (12) | 68 | 12 | 8 | 2 | 8 | 2 | — | — | 1.12 | 0.82 | 1600 | 72.2 | 15.1 | 8.02 | 0.44 |

TABLE 2-continued

| | Sample No. | Composition (Parts) | | | | | | | $\eta_{sp}$ | | Average Particle Diameter of Latex (Å) | Transparency | | Claud Value (%) | Gelation Property (Nm/min.) | Formability (g/cm³) |
|---|---|---|---|---|---|---|---|---|---|---|---|---|---|---|---|---|
| | | Monomer Mixture (A) | | Monomer Mixture (B) or Corresponding Mixture | | | | | Polymer at first step | Polymer at second step | | All Light Trans- mittance (%) | | | | |
| | | MMA | BA | MMA | BMA | BA | EA | AN | St | | | | | | | |
| 10 | (13) | 68 | 12 | 5 | — | 13 | — | 2 | — | 1.13 | 0.83 | 1600 | 69.5 | 15.5 | 7.99 | 0.47 |
| 11 | (14) | 68 | 12 | 5 | — | 13 | — | — | 2 | 1.13 | 0.85 | 1600 | 69.3 | 15.6 | 7.89 | 0.47 |
| 12 | (15) | 68 | 12 | 2 | — | 15 | 3 | — | — | 1.07 | 0.78 | 1500 | 67.0 | 18.2 | 7.24 | 0.50 |
| Com. Ex. No. | | | | | | | | | | | | | | | | |
| 4 | (16) | 68 | 12 | 16 | 4 | — | — | — | — | 1.12 | 0.80 | 1600 | 58.6 | 22.6 | 6.13 | 0.77 |
| 5 | (17) | 68 | 12 | 18 | 2 | — | — | — | — | 1.13 | 0.82 | 1600 | 55.2 | 25.8 | 5.93 | 0.82 |
| 6 | (18) | 68 | 12 | 12 | — | — | — | 3 | 5 | 1.09 | 0.78 | 1600 | 53.3 | 28.2 | 4.26 | 0.95 |

As is clear from the results of Table 2, it is seen that the composition having excellent gelation property and foamability can be obtained in an amount that a composition of a corresponding monomer mixture (B) is in the range of the present invention as in samples 11 to 15. On the other hand, it is seen that transparency, gelation property and foamability decrease by using samples 16 to 18 prepared from a monomer mixture (B), of which composition is not in the range of the present invention.

EXAMPLES 13 to 16 and COMPARATIVE EXAMPLES 7 to 8

According to the compositions shown in Table 3, samples 19 to 24 were obtained in the same manner as in Example 1. The above-mentioned evaluations were carried out for the obtained samples. Table 3 shows the results thereof.

EXAMPLES 17 to 20

According to the compositions shown in Table 4, samples 25 to 28 were obtained in the same manner as in Example 1. The above-mentioned evaluations were carried out for the obtained samples. Table 4 shows the results thereof.

COMPARATIVE EXAMPLE 9

An 8 litter reactor equipped with a stirrer was charged with 0.5 part of sodium dioctylsulfosuccinate previously dissolved in water, 0.03 part of potassium persulfate and additional water in an amount that a total amount of the water becomes 200 parts. After oxygen was replaced with nitrogen gas in the reactor, the content was heated to 70° C. with stirring.

Next, to the reactor was added continuously a monomer mixture (A) comprising 68 parts of MMA and 12 parts of BA

TABLE 3

| | Sample No. | Composition (Parts) | | | | $\eta_{sp}$ | | Average Particle Diameter of Latex (Å) | Transparency | Claud Value (%) | Gelation Property (Nm/min.) | Formability (g/cm³) |
|---|---|---|---|---|---|---|---|---|---|---|---|---|
| | | Monomer Mixture (A) | | Monomer Mixture (B) | | Polymer at first step | Polymer at second step | | All Light Transmittance (%) | | | |
| | | MMA | BA | MMA | BA | | | | | | | |
| Ex. No. | | | | | | | | | | | | |
| 13 | (19) | 51 | 9 | 12 | 28 | 1.23 | 0.80 | 1500 | 48.2 | 32.1 | 7.89 | 0.56 |
| 14 | (20) | 60 | 10 | 9 | 21 | 1.18 | 0.79 | 1500 | 67.2 | 16.7 | 8.14 | 0.47 |
| 15 | (21) | 68 | 12 | 6 | 14 | 1.12 | 0.84 | 1600 | 71.5 | 15.2 | 8.20 | 0.45 |
| 16 | (22) | 77 | 13 | 3 | 7 | 1.06 | 0.82 | 1600 | 67.5 | 16.6 | 8.02 | 0.50 |
| Com. Ex. No. | | | | | | | | | | | | |
| 7 | (23) | 32 | 8 | 18 | 42 | 1.35 | 0.80 | 1600 | 35.3 | 35.2 | 3.21 | 0.85 |
| 8 | (24) | 24 | 6 | 21 | 49 | 1.42 | 0.78 | 1600 | 28.4 | 38.2 | 3.13 | 0.91 |

As is clear from the results of Table 3, it is, seen that the composition having excellent gelation property and foamability can be obtained in an amount that a composition of a monomer mixture (A) is in the range of the present invention as in samples 19 to 22. On the other hand, it is seen that gelation property and foamability is not satisfactory in case that an amount of a monomer mixture (A) is smaller than the range of the present invention as in the samples 23 and 24.

at a rate of about 30 parts per an hour. After the completion of monomer mixture (A) addition, stirring was continued for one hour to complete the polymerization substantially.

To the mixture was added continuously a monomer mixture (B) comprising 6 parts of MMA and 14 parts of BA at a rate of about 30 parts per one hour. After the completion of monomer mixture (B) addition, the content was maintained at 70° C. for 90 minutes, and was cooled to obtain a latex.

The polymerization conversion was 99.4%. The obtained latex was coagulated by a calcium chloride aqueous solution in the same manner as in Example 1. After the latex was heated to 90° C., it was filtered by a centrifuge. The obtained dehydrated cake of the polymer mixture was washed with the same amount of water as the mixture, and it was dried at 50° C. for 15 hours by a parallel flow drier to obtain a white powder sample (29).

The above-mentioned evaluations were carried out by using the obtained sample. Table 4 shows results with prescriptions.

COMPARATIVE EXAMPLE 10

According to the compositions shown in Table 4, sample 30 was obtained in the same manner as in Example 9. The above-mentioned evaluations were carried out for the obtained sample. Table 4 shows the results thereof.

TABLE 5

| Sample No. | Combination Amount (Parts) | Transparency | | Gelation Property (Nm/min.) | Formability (g/cm³) |
| --- | --- | --- | --- | --- | --- |
| | | All Light Transmittance (%) | Claud Value (%) | | |
| Ex. No. | | | | | |
| 21 | (1) | 0.5 | 70.2 | 16.4 | 3.23 | 0.82 |
| 22 | (1) | 6 | 72.5 | 15.5 | 8.21 | 0.43 |
| 23 | (1) | 15 | 68.3 | 16.8 | 8.14 | 0.46 |
| Com. Ex. No. | | | | | |
| 11 | (1) | 0.01 | 50.5 | 16.8 | 1.42 | 1.02 |
| 12 | (1) | 40 | — | — | — | — |

TABLE 4

| Sample No. | Composition (Parts) | | | | Initiator (Parts) | Emulsifier (Parts) | $\eta_{sp}$ | | Average Particle Diameter of Latex (Å) | Transparency | | Gelation Property (Nm/min.) | Formability (g/cm³) |
| --- | --- | --- | --- | --- | --- | --- | --- | --- | --- | --- | --- | --- | --- |
| | Monomer Mixture (A) | | Monomer Mixture (B) | | | | Polymer at first step | Polymer at second step | | All Light Transmittance (%) | Claud Value (%) | | |
| | MMA | BA | MMA | BA | | | | | | | | | |
| Ex. No. | | | | | | | | | | | | | |
| 17 | (25) 68 | 12 | 6 | 14 | 0.05 | 0.7 | 0.92 | 0.63 | 1600 | 69.8 | 15.8 | 6.23 | 0.51 |
| 18 | (26) 68 | 12 | 6 | 14 | 0.01 | 0.7 | 1.01 | 0.73 | 1500 | 71.2 | 15.2 | 7.02 | 0.45 |
| 19 | (27) 68 | 12 | 6 | 14 | 0.005 | 0.7 | 1.13 | 0.84 | 1600 | 70.8 | 15.4 | 8.14 | 0.43 |
| 20 | (28) 68 | 12 | 6 | 14 | 0.001 | 0.7 | 1.22 | 1.00 | 1600 | 70.5 | 15.5 | 8.26 | 0.42 |
| Com. Ex. No. | | | | | | | | | | | | | |
| 9 | (29) 68 | 12 | 6 | 14 | 0.03 | 0.5 | 0.71 | 0.43 | 1500 | 71.8 | 15.0 | 5.37 | 0.82 |
| 10 | (30) 68 | 12 | 6 | 14 | 0.1 | 0.5 | 0.63 | 0.32 | 1600 | 71.9 | 15.0 | 4.02 | 0.89 |

As is clear from the results of Table 4, it is seen that foamability is not satisfactorily in case of the sample (29), wherein $\eta_{sp}$ of the polymer at the first step is at least 0.7 and $\eta_{sp}$ of the polymer at the second step is less than 0.5, and the sample (30), wherein $\eta_{sp}$ of the polymer at the first step is less than 0.7 and $\eta_{sp}$ of the polymer at the second step is less than 0.5. Therefore, it is concluded that $\eta_{sp}$ of the polymer at the first step should be at least 0.7 and $\eta_{sp}$ of the polymer at the second step should be at least 0.5.

EXAMPLES 21 to 23 and COMPARATIVE EXAMPLES 11 to 12

In order to evaluate an effect of mixing ratio of the sample (1) used in Example 1 with a vinyl chloride resin, the effect was evaluated in the same manner as mentioned above except that 6.0 parts of the sample (1) in the evaluation method changes to a mixing ratio described in Table 5. But in Comparative Example 12 the processed articles suitable for transparency and formability evaluation were not obtained, since uniformity of the composition decreased. Table 5 shows the results.

As is clear from the results of Table 5, it is seen that the composition mixed with the sample 1 in an amount of the present invention has excellent transparency, gelation property and formability. But it is also seen that gelation property and formability are not satisfactory in an amount below the present invention as in Comparative Example 11.

INDUSTRIAL APPLICABILITY

The resin composition containing the processing aid of the present invention is excellent in not only transparency but also gelation property and foamability. The resin composition having such excellent properties can be prepared by adding small amount, 0.1 to 30 parts by weight, of the processing aid based on 100 parts by weight of the vinyl chloride resin.

The invention claimed is:

1. A processing aid for a vinyl chloride resin; the processing aid having a specific viscosity $\eta_{sp}$ of 0.6-1.6, an average particle diameter of 1500-3000 Å and being obtained by polymerizing 1 to 50 parts by weight of a monomer mixture (B) comprising 0 to 49% by weight of methyl methacrylate, 51 to 100% by weight of at least one monomer selected from the group consisting of a methacrylate ester except methyl methacrylate and an acrylate ester, and 0 to 20 % by weight of a vinyl monomer copolymerizable therewith, in the presence of a latex of a (co)polymer having specific viscosity of at least $\eta_{sp}$ 0.7, which is obtained by polymerizing in emulsion 99 to 50 parts by weight of a monomer mixture (A) comprising 51 to 100% by weight of methyl methacrylate, 0 to 49 % by weight of at least one monomer selected from the group consisting of a methacrylate ester except methyl methacrylate and an acrylate ester, and 0 to 20 % by weight of a vinyl monomer copolymerizable therewith, the total amount of (A) and (B) being 100 parts by weight, and the specific viscosities being measured at 30° C. using Ubbelohde's Viscometer on 0.1 g of polymer dissolved in 100 mL chloroform.

2. The processing aid of claim 1, wherein the processing aid for a vinyl chloride resin is a processing aid for a vinyl chloride resin containing a foaming agent.

3. A vinyl chloride resin composition comprising 100 parts by weight of a vinyl chloride resin and 0.1 to 30 parts by weight of the processing aid of claim 1.

4. A vinyl chloride resin composition containing a foaming agent comprising 100 parts by weight of a vinyl chloride resin, 0.1 to 30 parts by weight of the processing aid of claim 1 and a foaming agent.

* * * * *